(12) United States Patent
Acharya et al.

(10) Patent No.: US 9,547,584 B2
(45) Date of Patent: Jan. 17, 2017

(54) REMOTE TESTING

(75) Inventors: Anish Acharya, Toronto (CA); Jeson Patel, Concord (CA)

(73) Assignee: Google Inc., Mountain View, CA (US)

( * ) Notice: Subject to any disclaimer, the term of this patent is extended or adjusted under 35 U.S.C. 154(b) by 559 days.

(21) Appl. No.: 13/413,832

(22) Filed: Mar. 7, 2012

(65) Prior Publication Data

US 2012/0233505 A1 Sep. 13, 2012

Related U.S. Application Data

(60) Provisional application No. 61/450,266, filed on Mar. 8, 2011.

(51) Int. Cl.
| | |
|---|---|
| G06F 11/36 | (2006.01) |
| G06F 11/25 | (2006.01) |
| G06F 11/22 | (2006.01) |
| G06F 11/26 | (2006.01) |
| G06Q 10/06 | (2012.01) |

(52) U.S. Cl.
CPC .......... *G06F 11/3688* (2013.01); *G06F 11/22* (2013.01); *G06F 11/25* (2013.01); *G06F 11/26* (2013.01); *G06Q 10/0639* (2013.01)

(58) Field of Classification Search
CPC ........ G06F 11/00; G06F 1/22; G06F 11/3688; G06F 11/25; G06Q 30/00; G06Q 10/0639
See application file for complete search history.

(56) References Cited

U.S. PATENT DOCUMENTS

| | | | |
|---|---|---|---|
| 6,895,577 B1 * | 5/2005 | Noble ................ | G06F 11/3676 714/38.12 |
| 7,483,381 B1 * | 1/2009 | Hansen et al. ................ | 370/241 |
| 8,108,711 B2 * | 1/2012 | Meijer et al. ................... | 714/4.1 |
| 2003/0074606 A1 * | 4/2003 | Boker ................ | G06F 11/3495 714/42 |
| 2003/0100299 A1 * | 5/2003 | Ko et al. ........................ | 455/423 |
| 2005/0044508 A1 | 2/2005 | Stockton | |
| 2006/0031476 A1 * | 2/2006 | Mathes et al. ................ | 709/224 |
| 2006/0242638 A1 | 10/2006 | Lew et al. | |
| 2008/0027913 A1 * | 1/2008 | Chang ..................... | G06F 17/30 |
| 2009/0307763 A1 * | 12/2009 | Rawlins et al. .................. | 726/5 |

(Continued)

FOREIGN PATENT DOCUMENTS

EP 0 268 241 6/2009 .............. G06F 9/44

OTHER PUBLICATIONS

"Remote Testing and Diagnosis of System-on-Chips Using Network Management Frameworks", by Oussama Laouamri and Chouki Aktouf, 2007, EDAA.*

"Remote Web Site Usability Testing", by Jessica Gardner, Statistical Division, United Nations Economic Commission for Europe, Geneva, Switzerland, International Journal of Public Information Systems, vol. 2007:2.*

(Continued)

*Primary Examiner* — Pan Choy
(74) *Attorney, Agent, or Firm* — Fish & Richardson P.C.

(57) ABSTRACT

Methods, systems, and apparatus, including computer programs encoded on a computer storage medium, for remote testing. In one aspect, a method includes receiving a first message from a first user device indicating initialization of a client application. The method includes determining that the first user device is a member of a first testing group. The method includes identifying a first testing component associated with the first testing group and capable of altering the client application. The method includes sending the first testing component to the first user device.

15 Claims, 3 Drawing Sheets

(56) References Cited

U.S. PATENT DOCUMENTS

2010/0218044 A1* 8/2010 Roblett ............... H04L 43/50
 714/32
2012/0054552 A1* 3/2012 Artzi et al. ................ 714/38.1
2013/0024173 A1* 1/2013 Brzezicki et al. ............. 703/6

OTHER PUBLICATIONS

"Design and Development of a Modular Platform for Remotely Testing DC Motors via the Internet", by Michael-Anthony Clarke Tedesco, Institute for Aerospace Studies, University of Toronto, 2010.*
"Optimizing Effectiveness and Efficiency of Software Testing", by Kera Zakiyah Bell, Department of Computer Science, North Carolina State University, Raleigh, 2006.*
"Collecting Subjective Data in Remote Usability Testing", by Cassandra L. Holmes, Department of Psychology, Carleton University, Ontaria, Canada, May 2003.*
"Wireless Testing", by Michael Monks, Telephony; Nov. 13, 1995; 229, 20; ProQuest Central. p. 38.*
"Improving Test Suites for Efficient Fault Localization", by Baudry et al., ICSE'06, May 20-28, 2006, Shanghai, China.*
"A Similarity-Aware Approach to Testing Based Fault Localization", by Hao et al., Nov. 2005, ACM, p. 291-294.*
"Remote Web Site Usability Testing", by Jessica Gardner, International Journal of Public Information Systems, vol. 2, 2007.*
Notification of Transmittal of the International Search Report and the Written Opinion of the International Searching Authority, or the Declaration for International Application No. PCT/US2012/028028 dated Jun. 6, 2012.
International Preliminary Report on Patentability mailed Sep. 19, 2013 in international application No. PCT/US2012/028028, 8 pgs.

* cited by examiner

REMOTE TESTING

CROSS-REFERENCE TO RELATED APPLICATIONS

This application claims priority to U.S. Provisional Application Ser. No. 61/450,266, filed on Mar. 8, 2011, entitled "REMOTE TESTING."

BACKGROUND

This specification relates to web based applications.

Web applications are accessed by users over a network, for example, the Internet. The applications may be deployed for informational or productivity purposes. Some web applications are transmitted to a user device each time a user wishes to access the application. Other web applications install a client portion of the application on the user device (for example, applications on a mobile device).

Some operators of the web applications earn revenue through advertising and/or subscriptions. In general, the more popular the web application, the more revenue is available to the operator.

SUMMARY

This specification describes technologies relating to testing a web-based application.

In general, one innovative aspect of the subject matter described in this specification can be embodied in methods that include the actions of receiving a first message from a first user device indicating initialization of a client application. Methods also include the actions of determining that the first user device is a member of a first testing group. Methods also include the actions of identifying a first testing component associated with the first testing group and capable of altering the client application. Methods also include the actions of sending the first testing component to the first user device. Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Methods may also include the actions of receiving data from the first user device, the data being indicative of interactions between a user and the first user device; and calculating metrics using the received data. Methods may also include the actions of removing the first user device from the first testing group; and sending a second message to the first user device, the second message instructing the first user device to stop using the first testing component. Methods may also include the actions of receiving a second message from a second user device indicating initialization of the client application; determining that the second user device is a member of a second testing group; identifying a second testing component, different from the first testing component, associated with the second testing group and capable of altering the client application; and sending the second testing component to the second user device. Methods may also include the actions of receiving data from the first user device and the second user device; calculating first metrics associated with the first testing group and second metrics associated with the second testing group using the received data; determining that the first metrics indicate better performance than the second metrics; and sending the first testing component to the second user device.

Particular embodiments of the subject matter described in this specification can be implemented so as to realize one or more of the following advantages. Multiple experiments can be run simultaneously.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
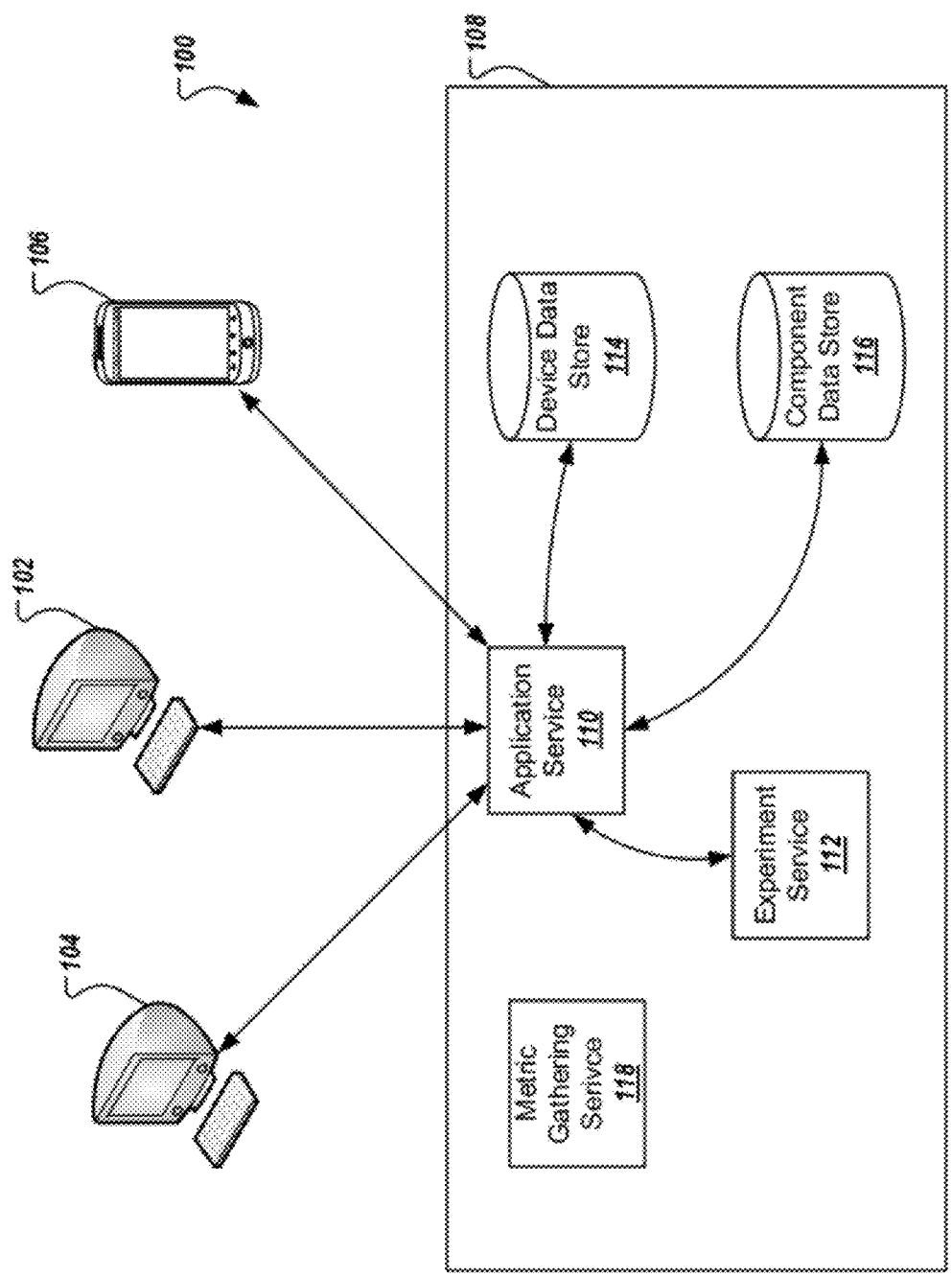
FIG. 1A illustrates an example of a system for remote application control.

FIG. 1A illustrates an example of a system 100 for remote application control. An application running on user devices (for example, computer 102, computer 104, and smart phone 106) are tuned for enhanced performance after initial launch. Performance can be measured by gathering information and calculating metrics, including but not limited to user retention, user engagement, user driven distribution (e.g. the number of invitations sent and accepted), and average revenue per user.

Operators of applications can perform experiments including modifying the application. Data can be collected during the experiment and changes in the metrics can be measured. For example, an operator of a web based game may alter a game to present a different message when a user passes a certain level of the game. These experiments can be made such that each user of the web application is presented with the changed application, or such that only a limited number of users are exposed to the change. The experiments are analyzed to determine if they impact metrics in a positive, negative, or neutral manner.

In some implementations, not all user devices are included in the experiment. For example, computer 104 may be included in the experiment while computer 102 is not. In some implementations, multiple experiments can be performed simultaneously, for example, computer 102 may be part of a control group, computer 104 may be part of an experimental group, and smart phone 106 may be part of another experimental group. Metrics collected from the control group are compared to the metrics collected from the experimental groups.

Experiments can be single-variable, where only a single factor is changed in the application or a multi-variable experiment, where several factors are changed in the application for a single experimental group. For example, for an e-commerce website, a control group may receive an application that has a button with a blue background color and text reading 'Order'. A first control group may receive an application in which a single-variable is changed, for example, the color of the button. Multiple experimental groups may each receive a button with a different color (e.g. yellow, red, green, etc.).

The impact on the metrics is measured for each group. The group with the most desirable combination of metrics can be selected to be the permanent solution. For example, the group that had the highest conversion rate, that is, the highest number of users who clicked the button and eventually purchased an item associated with the button, can be considered the most desirable. The button color for that group may then be adopted for the application.

To create the control and experimental groups, the users are segmented. In some implementations, the control group is chosen to be larger than the experimental groups. For example, a control group can have 80% of the users, and each of two experimental groups can have 10% of the users.

In some implementations, the users are segmented and assigned to each group randomly. In other implementations, the users are segmented based on demographic criteria, for example, gender, age and location.

For web-based applications, experiments can be run without deploying any special software on the user devices. The user interface is generated by the server and can be redeployed for any new experiments. For mobile applications that install software on the user device (for example, an application installed on a smart phone), running an experiment is more complicated because the user interface can be pre-installed on the mobile device.

To dynamically execute experiments on mobile and user devices, the mobile and user devices register user information with an application service 110 executing on a server 108. The user information can include device type, carrier type, and/or browser type. The server can store the user information in a device data store 114.

In some implementations, an application is pre-installed on each of the user devices. The application can include default components including images, text, layout information, and application flow information that are used by the application as a default. When the user device executes the application, the application sends a request to the application service 110 to determine the components to execute as part of the application.

The application identifies the user device in the device data store 114 and sends an identification of the user device to an experiment service 112. The experiment service 112 determines if the user device is part of an experiment. If the user device is part of the experiment, then the application service 110 obtains components corresponding to the experiment from the component data store 116. The obtained components are sent to the user device.

The user device uses the components corresponding to the experiment instead of the default components. Using this mechanism, the server 108 can override any of the components installed on the user device as part of the application, including images, text, layout information, and application flow information. For example, the server 108 can insert a new screen into the application flow, alter text in the user interface, change images, and/or restructure user screens.

In some implementations, a server 108 can push new components. The new components override execution of the application at any point. The components may be sent before or during. In some implementations, the server 108 can terminate an experiment by sending a message to the user device, instructing the application to revert to default values. In some implementations, the server 108 can alter the default components of the application.

For example, a mobile commerce application includes a button for initiating the purchase of an item. The mobile commerce application includes a set of default components. The components can be described, for example, using XML as follows:

```
<?xml version="1.0" encoding="UTF-8"?>
    <resourcePackage id="default">
    <resource id="purchase-button">
        <type>image</type>
        <value>http://www.example.com/images/buttons/purchase_button_1.jpg</value>
    </resource>
    <resource id="purchase-label">
        <type>string</type>
        <value>Order</value>
    </resource>
    <resource id="purchase-border-colour">
        <type>colour</type>
        <value>blue</value>
    </resource>
    <resource id="home-background-colour">
        <type>colour</type>
        <value>green</value>
    </resource>
    ....
<resourcePackage/>
```

In this example, when the application displays the purchase button, the application looks to the xml to find the image to use for displaying the button. To initiate an experiment, the server sends a component override with different values for specific components involved in the experiment. In this example, to change the label on the purchase button, the server sends an XML message as follows:

```
<?xml version="1.0" encoding="UTF-8"?>
<resourcePackage id="experiment_purchase_button_1">
    <resource id="purchase-label">
        <type>string</type>
        <value>Buy Now!</value>
    </resource>
<resourcePackage/>
```

In some implementations, before assigning a user device to an experimental group, the server 108 stores an experiment identifier and information identifying the user device (e.g. a user identifier or a device identifier) with the experiment service 112.

Data is collected until a threshold amount of data is collected and is analyzed to see which experiment best improved metrics, including, but not limited to, user retention, user engagement, distribution, and average revenue per user. Threshold amounts of data may vary for each experiment. In some implementations, the threshold may be defined based on a period of time (e.g. one day, one week, one month). In other implementations, the threshold is based on an amount of data collected (e.g. the number of clicks, number of impressions).

For example, an experiment includes testing the effects of three new purchase buttons. The experiment service 112 establishes one control group and three experimental groups. The control group maintains the default button. Each experimental group is provided one of the three new purchase buttons.

After a certain threshold is reached, the metric gathering service 118 analyzes the data from each experimental group and the control group to determine metrics. The experiment service may compare the metrics to see which group had the best performance. In some implementations, a key metric may be defined and associated with the experiment. For example, an experiment may be attempting to optimize the average revenue per user.

Figure 1B:
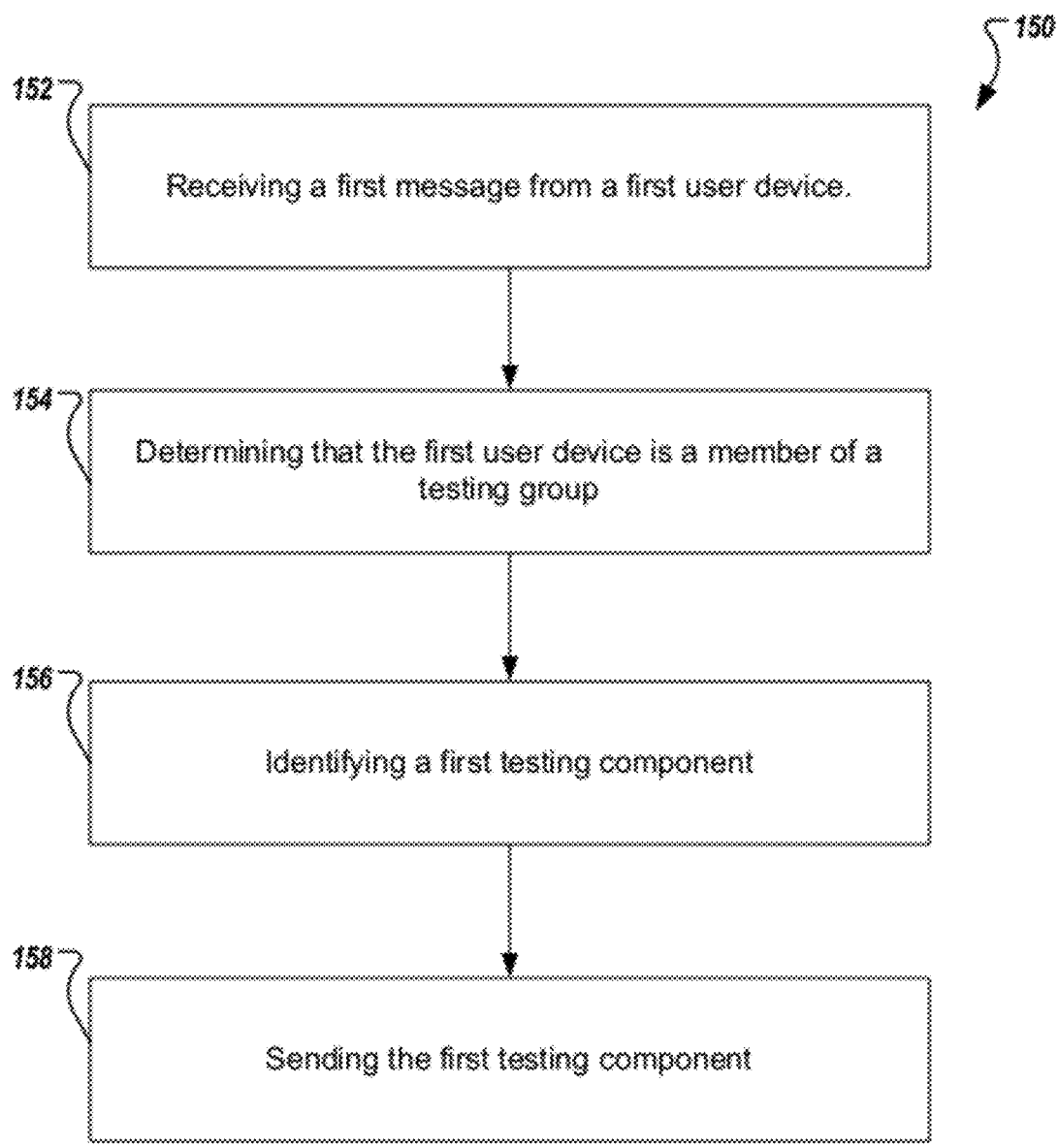
FIG. 1B is a flow chart of an example of a process for remote testing.

FIG. 1B is a flow chart of an example of a process 150 for remote testing. The process may be performed by, for example, the server 108 of FIG. 1.

A first message is received (152) from a first user device indicating initialization of a client application. The first message may be sent by a user device, for example, computer 102, computer 104, and smart phone 106 of FIG. 1. Other user devices may also send the first message, for example, tablet computers.

The first user device is determined (154) that the first user device is a member of a first testing group. The user of the user device may have elected to be a member of the testing group, or may have been randomly selected. In some implementations, the user is provided the option to opt-in or opt-out from being a member of a testing group.

A first testing component may be identified (156) where the first testing component associated with the first testing group and capable of altering the client application. Each testing group may be associated with a different testing component; the testing component may alter the flow or execution of the client application on the first user device.

The first testing component is sent (156) to the first user device.

Figure 2:
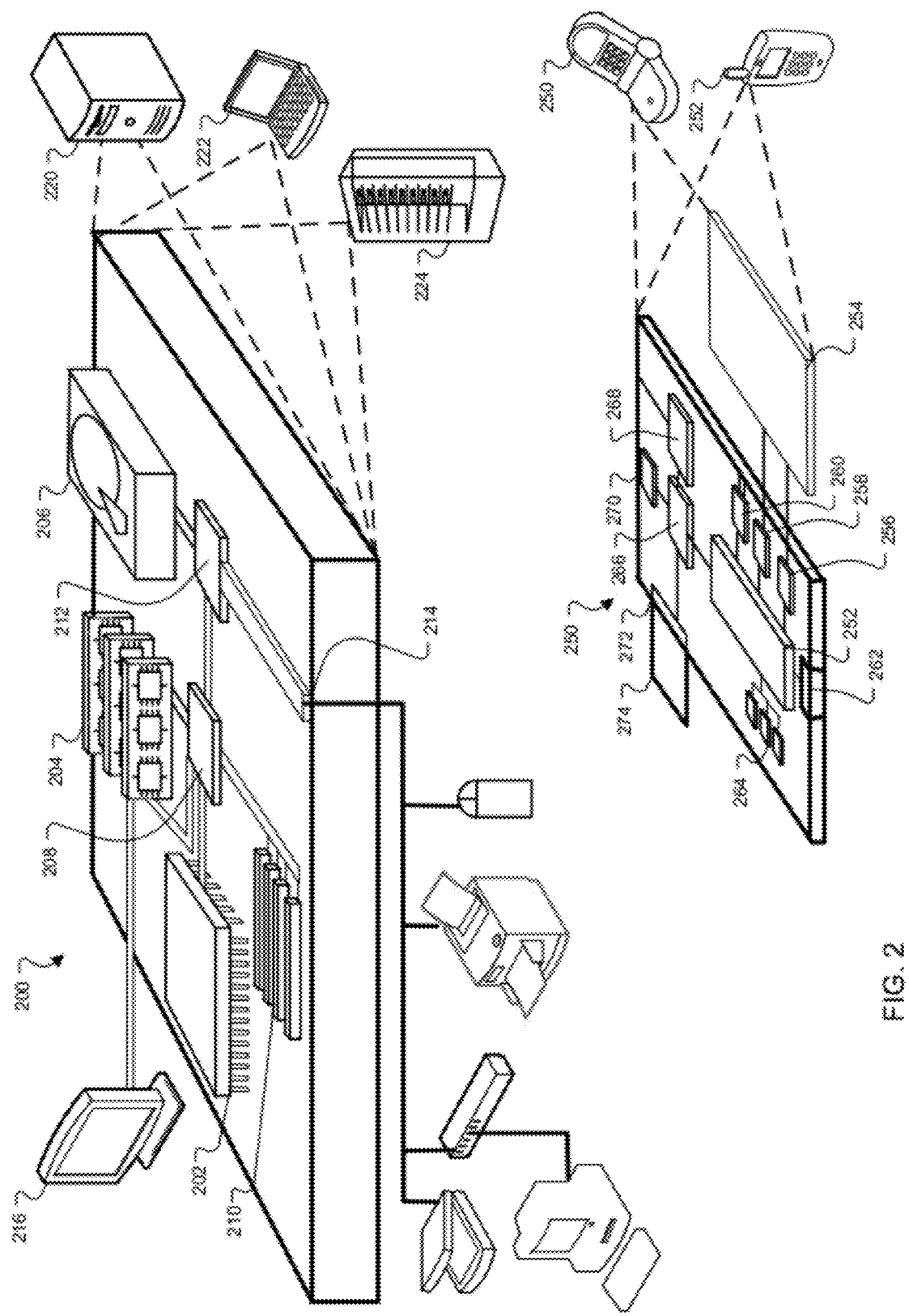
FIG. 2 is a block diagram of computing devices 200, 250 that may be used to implement the systems and methods described in this document, as either a client or as a server or plurality of servers.

FIG. 2 is a block diagram of computing devices 200, 250 that may be used to implement the systems and methods described in this document, as either a client or as a server or plurality of servers. Computing device 200 is intended to represent various forms of digital computers, such as laptops, desktops, workstations, personal digital assistants, servers, blade servers, mainframes, and other appropriate computers. Computing device 250 is intended to represent various forms of mobile devices, such as personal digital assistants, cellular telephones, smartphones, and other similar computing devices. Additionally computing device 200 or 250 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, or memory on processor 202.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Alternatively, components from computing device 200 may be combined with other components in a mobile device (not shown), such as device 250. Each of such devices may contain one or more of computing device 200, 250, and an entire system may be made up of multiple computing devices 200, 250 communicating with each other.

Computing device 250 includes a processor 252, memory 264, an input/output device such as a display 254, a communication interface 266, and a transceiver 268, among other components. The device 250 may also be provided with a storage device, such as a microdrive or other device, to provide additional storage. Each of the components 250, 252, 264, 254, 266, and 268, are interconnected using various buses, and several of the components may be mounted on a common motherboard or in other manners as appropriate.

The processor 252 can execute instructions within the computing device 250, including instructions stored in the memory 264. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 250, such as control of user interfaces, applications run by device 250, and wireless communication by device 250.

Processor 252 may communicate with a user through control interface 258 and display interface 256 coupled to a display 254. The display 254 may be, for example, a TFT (Thin-Film-Transistor Liquid Crystal Display) display or an OLED (Organic Light Emitting Diode) display, or other appropriate display technology. The display interface 256 may comprise appropriate circuitry for driving the display 254 to present graphical and other information to a user. The control interface 258 may receive commands from a user and convert them for submission to the processor 252. In addition, an external interface 262 may be provide in communication with processor 252, so as to enable near area communication of device 250 with other devices. External interface 262 may provide, for example, for wired communication in some implementations, or for wireless communication in other implementations, and multiple interfaces may also be used.

The memory 264 stores information within the computing device 250. The memory 264 can be implemented as one or more of a computer-readable medium or media, a volatile memory unit or units, or a non-volatile memory unit or units. Expansion memory 274 may also be provided and connected to device 250 through expansion interface 272, which may include, for example, a SIMM (Single In Line Memory Module) card interface. Such expansion memory 274 may provide extra storage space for device 250, or may also store applications or other information for device 250. Specifically, expansion memory 274 may include instructions to carry out or supplement the processes described above, and may include secure information also. Thus, for example, expansion memory 274 may be provide as a security module for device 250, and may be programmed with instructions that permit secure use of device 250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264, expansion memory 274, or memory on processor 252 that may be received, for example, over transceiver 268 or external interface 262.

Device 250 may communicate wirelessly through communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, GPS (Global Positioning System) receiver module 270 may provide additional navigation- and location-related wireless data to device 250, which may be used as appropriate by applications running on device 250.

Device 250 may also communicate audibly using audio codec 260, which may receive spoken information from a user and convert it to usable digital information. Audio codec 260 may likewise generate audible sound for a user, such as through a speaker, e.g., in a handset of device 250. Such sound may include sound from voice telephone calls, may include recorded sound (e.g., voice messages, music files, etc.) and may also include sound generated by applications operating on device 250.

The computing device 250 may be implemented in a number of different forms, as shown in the figure. For example, it may be implemented as a cellular telephone 280. It may also be implemented as part of a smartphone 282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of social network graphs and methods have been described, it should be recognized that numerous other applications are contemplated. Accordingly, other embodiments are within the scope of the following claims.

What is claimed is:

1. A method comprising:
receiving, by a server system and from each of a plurality of user devices, a message indicating that a client application installed on the user device is to be executed on the user device, wherein the client application includes a collection of default components that specify a default manner in which the client application is to be executed on the user device;
determining, by the server system and in response to receiving the messages from the plurality of user devices that indicate the client application installed on each of the user devices is to be executed on each of the user devices, that:
(i) a first subset of user devices from the plurality of user devices are assigned to a testing group for an experiment associated with the client application, and
(ii) a second subset of user devices from the plurality of user devices are assigned to a control group for the experiment associated with the client application;
identifying a testing component to send to the user devices in the first subset of user devices based on the first subset of user devices being assigned to the testing group, wherein the testing component is configured to alter the default manner in which the client application is to be executed on the user devices in the first subset of user devices by overriding one or more of the default components in the collection of default components of the client application installed on the user devices in the first subset of user devices;
sending, by the server system, the testing component to the user devices in the first subset of user devices to cause the user devices in the first subset of user devices to execute the client application in the altered manner;
receiving, by the server system and from at least some of the user devices in the first subset of user devices, first data that characterizes user interactions with the client application executing in the altered manner on the at least some of the user devices in the first subset of user devices;
receiving, by the server system and from at least some of the user devices in the second subset of user devices, second data that characterizes user interactions with the client application executing in the default manner on the at least some of the user devices in the second subset of user devices;
determining, by the server system and based on the first data from the at least some of the user devices in the first subset of user devices and the second data from the at least some of the user devices in the second subset of user devices, whether executing the client application in the default manner or executing the client application in the altered manner results in better performance of at least a subset of user devices; and
in response to determining that executing the client application in the altered manner rather than the default manner results in better performance of at least a subset of user devices, taking action by the server system to cause at least one user device that is not among the first subset of user devices to override the one or more default components in the collection of default components of the client application installed on the at least one user device.

2. The method of claim 1, further comprising:
after sending the testing component to a first user device in the first subset of user devices, removing the first user device from the testing group; and
sending, from the server system and to the first user device as a result of the first user device being removed from the testing group, a second message to the first user device, the second message instructing the first user device to not use the testing component when executing the client application on the first user device.

3. The method of claim 1, further comprising:
determining, by the server system and in response to receiving the messages from the plurality of user devices, that a third subset of user devices from the plurality of user devices are assigned to a second testing group for the experiment associated with the client application;
identifying a second testing component, different from the testing component to send to the user devices in the third subset of user devices based on the third subset of user devices being assigned to the second testing group, wherein the second testing component is different than the testing component, wherein the second testing component is configured to cause the client application to be executed on the user devices in the third subset of user devices in a second altered manner different from the altered manner, rather than the default manner, by overriding one or more of the default components in the collection of default components of the client application installed on the user devices in the third subset of user devices; and
sending, by the server system, the second testing component to the user devices in the third subset of user devices to cause the user devices in the third subset of user devices to execute the client application in the second altered manner.

4. The method of claim 3, further comprising:
receiving, by the server system and from at least some of the user devices in the third subset of user devices, third data that characterizes user interactions with the client application executing in the second altered manner on the at least some of the user devices in the third subset of user devices; and comparing, the first data from the at least some of the user devices in the first subset of user devices with the third data from the at least some of the user devices in the third subset of user devices to determine whether executing the client application in the altered manner or in the second altered manner results in better performance of at least a subset of user devices.

5. The method of claim 1, wherein sending the testing component to a first user device in the first subset of user devices comprises transmitting the testing component to the first user device before the client application is executed on the first user device to cause the first user device to re-configure the client application with the testing component before the client application is executed on the first user device.

6. The method of claim 1, wherein sending the testing component to a first user device in the first subset of user devices comprises transmitting the testing component to the first user device while the client application is executing on the first user device so as to cause the first user device to re-configure the client application with the testing component while the client application is executing on the first user device.

7. The method of claim 1, wherein the testing component comprises modified computer code that is configured to replace default computer code for only a portion of the collection of default components of the client application on the user devices in the first subset of user devices without the client application being re-installed on the user devices in the first subset of user devices.

8. A non-transitory computer storage device encoded with computer program instructions that when executed by one or more computers cause the one or more computers to perform operations comprising:
receiving, by a server system and from each of a plurality of user devices, a message indicating that a client application installed on the user device is to be executed on the user device, wherein the client application includes a collection of default components that specify a default manner in which the client application is to be executed on the user device;
determining, by the server system and in response to receiving the messages from the plurality of user devices that indicate the client application installed on each of the user devices is to be executed on each of the user devices, that:
(i) a first subset of user devices from the plurality of user devices are assigned to a testing group for an experiment associated with the client application, and
(ii) a second subset of user devices from the plurality of user devices are assigned to a control group for the experiment associated with the client application;
identifying a testing component to send to the user devices in the first subset of user devices based on the first subset of user devices being assigned to the testing group, wherein the testing component is configured to alter the default manner in which the client application is to be executed on the user devices in the first subset of user devices by overriding one or more of the default components in the collection of default components of the client application installed on the user devices in the first subset of user devices;
sending, by the server system, the testing component to the user devices in the first subset of user devices to cause the user devices in the first subset of user devices to execute the client application in the altered manner;
receiving, by the server system and from at least some of the user devices in the first subset of user devices, first data that characterizes user interactions with the client application executing in the altered manner on the at least some of the user devices in the first subset of user devices;
receiving, by the server system and from at least some of the user devices in the second subset of user devices, second data that characterizes user interactions with the client application executing in the default manner on the at least some of the user devices in the second subset of user devices;
determining, by the server system and based on the first data from the at least some of the user devices in the first subset of user devices and the second data from the at least some of the user devices in the second subset of user devices, whether executing the client application in the default manner or executing the client application in the altered manner results in better performance of at least a subset of user devices; and
in response to determining that executing the client application in the altered manner rather than the default manner results in better performance of at least a subset of user devices, taking action by the server system to cause at least one user device that is not among the first subset of user devices to override the one or more default components in the collection of default components of the client application installed on the at least one user device.

9. The non-transitory computer storage device of claim 7, further comprising:
after sending the testing component to a first user device in the first subset of user devices, removing the first user device from the testing group; and
sending, from the server system and to the first user device as a result of the first user device being removed from the testing group, a second message to the first user device, the second message instructing the first user device to not use the testing component when executing the client application on the first user device.

10. The non-transitory computer storage device of claim 8, further comprising:
determining, by the server system and in response to receiving the messages from the plurality of user devices, that a third subset of user devices from the plurality of user devices are assigned to a second testing group for the experiment associated with the client application;
identifying a second testing component, different from the testing component to send to the user devices in the third subset of user devices based on the third subset of user devices being assigned to the second testing group, wherein the second testing component is different than the testing component, wherein the second testing component is configured to cause the client application to be executed on the user devices in the third subset of user devices in a second altered manner different from the altered manner, rather than the default manner, by overriding one or more of the default components in the collection of default components of the client application installed on the user devices in the third subset of user devices; and
sending, by the server system, the second testing component to the user devices in the third subset of user devices to cause the user devices in the third subset of user devices to execute the client application in the second altered manner.

11. The non-transitory computer storage device of claim 10, further comprising:
receiving, by the server system and from at least some of the user devices in the third subset of user devices, third data that characterizes user interactions with the client application executing in the second altered manner on the at least some of the user devices in the third subset of user devices; and
comparing, the first data from the at least some of the user devices in the first subset of user devices with the third data from the at least some of the user devices in the third subset of user devices to determine whether executing the client application in the altered manner or in the second altered manner results in better performance of at least a subset of user devices.

12. A server system comprising:
one or more computers and one or more storage devices storing instructions that are operable, when executed by the one or more computers, to cause the one or more computers to perform operations comprising:
receiving, by the server system and from each of a plurality of user devices, a message indicating that a client application installed on the user device is to be executed on the user device, wherein the client application includes a collection of default components that specify a default manner in which the client application is to be executed on the user device;
determining, by the server system and in response to receiving the messages from the plurality of user devices that indicate the client application installed on each of the user devices is to be executed on each of the user devices, that:
(i) a first subset of user devices from the plurality of user devices are assigned to a testing group for an experiment associated with the client application, and
(ii) a second subset of user devices from the plurality of user devices are assigned to a control group for the experiment associated with the client application;
identifying a testing component to send to the user devices in the first subset of user devices based on the first subset of user devices being assigned to the testing group, wherein the testing component is configured to alter the default manner in which the client application is to be executed on the user devices in the first subset of user devices by overriding one or more of the default components in the collection of default components of the client application installed on the user devices in the first subset of user devices;
sending, by the server system, the testing component to the user devices in the first subset of user devices to cause the user devices in the first subset of user devices to execute the client application in the altered manner;
receiving, by the server system and from at least some of the user devices in the first subset of user devices, first data that characterizes user interactions with the client application executing in the altered manner on the at least some of the user devices in the first subset of user devices;
receiving, by the server system and from at least some of the user devices in the second subset of user devices, second data that characterizes user interactions with the client application executing in the default manner on the at least some of the user devices in the second subset of user devices;
determining, by the server system and based on the first data from the at least some of the user devices in the first subset of user devices and the second data from the at least some of the user devices in the second subset of user devices, whether executing the client application in the default manner or executing the client application in the altered manner results in better performance of at least a subset of user devices; and
in response to determining that executing the client application in the altered manner rather than the default manner results in better performance of at least a subset of user devices, taking action by the server system to cause at least one user device that is not among the first subset of user devices to override the one or more default components in the collection of default components of the client application installed on the at least one user device.

13. The server system of claim 12, further comprising:
after sending the testing component to a first user device in the first subset of user devices, removing the first user device from the testing group; and
sending, from the server system and to the first user device as a result of the first user device being removed from the testing group, a second message to the first user device, the second message instructing the first user device to not use the testing component when executing the client application on the first user device.

14. The server system of claim 12, further comprising:
determining, by the server system and in response to receiving the messages from the plurality of user devices, that a third subset of user devices from the plurality of user devices are assigned to a second testing group for the experiment associated with the client application;
identifying a second testing component, different from the testing component to send to the user devices in the third subset of user devices based on the third subset of user devices being assigned to the second testing group, wherein the second testing component is different than the testing component, wherein the second testing component is configured to cause the client application to be executed on the user devices in the third subset of user devices in a second altered manner different from the altered manner, rather than the default manner, by overriding one or more of the default components in the collection of default components of the client application installed on the user devices in the third subset of user devices; and
sending, by the server system, the second testing component to the user devices in the third subset of user devices to cause the user devices in the third subset of user devices to execute the client application in the second altered manner.

15. The server system of claim 14, further comprising:
receiving, by the server system and from at least some of the user devices in the third subset of user devices, third data that characterizes user interactions with the client application executing in the second altered manner on the at least some of the user devices in the third subset of user devices; and
comparing, the first data from the at least some of the user devices in the first subset of user devices with the third data from the at least some of the user devices in the third subset of user devices to determine whether executing the client application in the altered manner or in the second altered manner results in better performance of at least a subset of user devices.

* * * * *